United States Patent [19]

Shin

[11] Patent Number: 5,630,609
[45] Date of Patent: May 20, 1997

[54] FRONT WHEEL SUSPENSION FOR A VEHICLE

[75] Inventor: Dong-Woo Shin, Kyungsangnam-Do, Rep. of Korea

[73] Assignee: Hyundai Motor Company, Ltd., Seoul, Rep. of Korea

[21] Appl. No.: 427,825

[22] Filed: Apr. 26, 1995

[30] Foreign Application Priority Data

May 4, 1994 [KR] Rep. of Korea .................... P94-9882

[51] Int. Cl.$^6$ .................................................. B60G 3/00
[52] U.S. Cl. .......................... 280/664; 280/673; 280/721; 280/691
[58] Field of Search ................................ 280/691, 692, 280/695, 697, 721, 722, 723, 673, 96.1, 700, 664, 717, 665; 267/273, 276

[56] References Cited

U.S. PATENT DOCUMENTS

| 3,181,885 | 5/1965 | Baracos et al. ...................... 280/723 |
| 4,033,605 | 7/1977 | Smith et al. ........................... 280/723 |
| 4,252,339 | 2/1981 | Shimizu et al. ....................... 280/673 |
| 4,327,927 | 5/1982 | Tanaka et al. ......................... 280/691 |
| 4,469,349 | 9/1984 | Tomita et al. ......................... 267/273 |
| 4,621,831 | 11/1986 | Takadera et al. ...................... 267/276 |

FOREIGN PATENT DOCUMENTS 63-287616  11/1988  Japan ..................................... 267/276

*Primary Examiner*—Paul N. Dickson

[57] ABSTRACT

A front wheel suspension apparatus for a vehicle, includes an elastic tiebar member connected to a torsion bar and a strut bar, the elastic tiebar having an elastic material tube for absorbing any impact delivered from the strut bar, and outer or inner tube connected to a frame through a link for preventing the impact from being delivered to the frame.

9 Claims, 2 Drawing Sheets

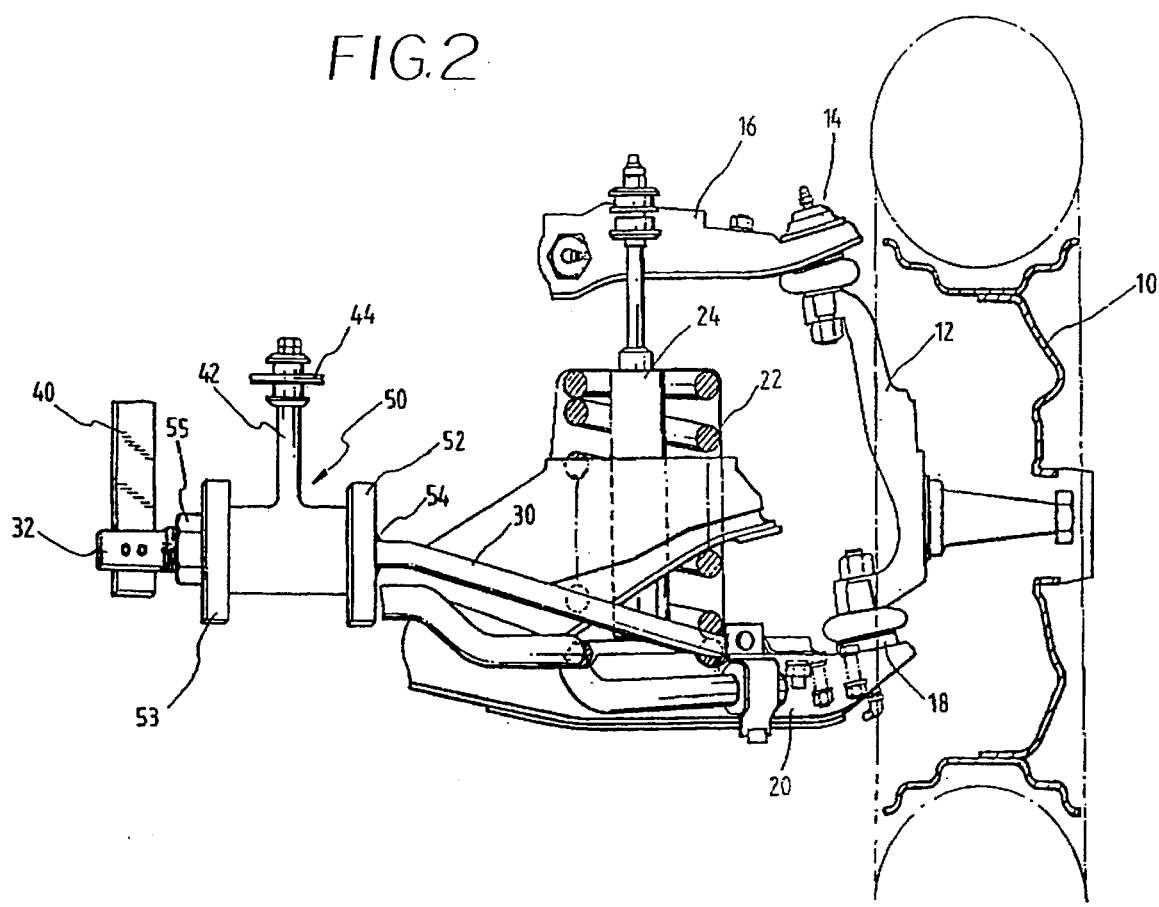
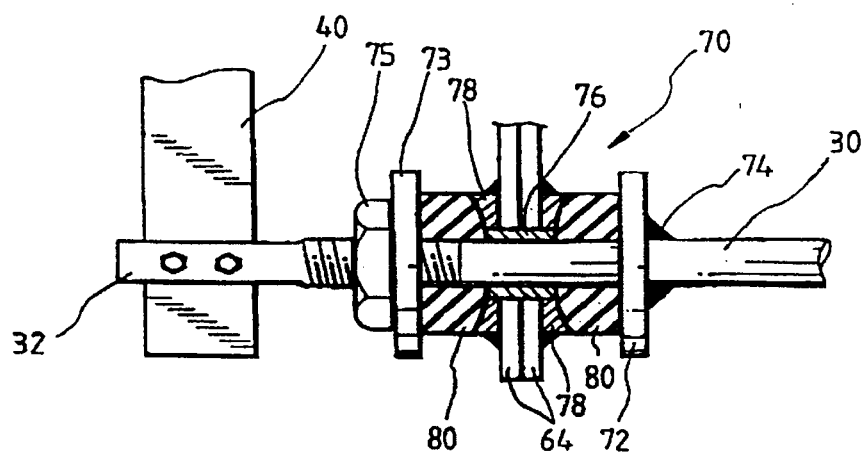

1

FRONT WHEEL SUSPENSION FOR A VEHICLE

BACKGROUND OF THE INVENTION

1. Field of the Invention

The present invention relates to a front wheel suspension apparatus for a vehicle and more particularly, to an improved front wheel suspension apparatus for a vehicle, including right and left strut bars having a torsion bar mounted to the right and left strut bars, respectively, for reducing rolling of the vehicle.

2. Description of the Related Art

Various apparatus for front wheel suspension of a vehicle are known which relieve rolling of the vehicle causing impact thereto or vibration thereof. There are two suspension systems, a composite suspension system and an independent suspension system. The composite suspension system includes an autobody, a composite axle provided with both side wheels, and springs for mounting the composite axle to the autobody therethrough. The independent suspension system for an automobile includes a plurality of separate axles, and wheels mounted to respective axles.

However, when a vehicle having such an independent wheel suspension system turns and drives on a rough road such as an unpaved road, the autobody of the vehicle leans to one side, so that the vehicle rolls to the right or left. Therefore, in order to reduce the rolling of a vehicle, the vehicles provide a kind of stabilizer therewith. That is, when the wheels move up and down, the stabilizer has torsion so that the stabilizer can reduce the rolling and maintain the balance of the vehicle due to the elasticity of the stabilizer.

Generally, as shown in FIG. 1, a vehicle having a suspension stabilizer includes wheel supporters 12 for rotatably supporting wheels 10 thereon, upper arms 16 connected to the wheel supporters 12 through upper ball joints 14 for enabling movement of the upper arms 16 to the right and left, and up and down directions, and lower arms 20 connected to the wheel supporters 12 through lower ball joints 18. The upper and lower arms 16 and 20 are attached to the vehicle body through a rubber elastic material.

Also, a coil spring 22 is inserted between the upper and lower arms 16 and 20 for preventing impact from the road surface and vibration of the wheels from transferring to the vehicle body, and a shock absorber 24 is disposed within the coil spring 22 for moving the coil spring 22 up and down between the upper and lower arms 16 and 20.

A strut bar 28 is disposed on the lower arm 20 for supporting a load of a front axle, and a driving force and a braking force and a stabilizer 26 is mounted to the lower arm 20 for reducing the rolling of the vehicle.

However, such a conventional wheel suspension apparatus having a stabilizer suffers from a number of problems such as, for example, it is complicated in structure due to use of multiple parts such as various types of elastic materials and connecting links, it is difficult to assemble, and it is too weak to reduce the rolling of the vehicle by use of only a stabilizer.

SUMMARY OF THE INVENTION

Accordingly, it is an object of the present invention to provide an improved front wheel suspension apparatus for a vehicle, which eliminates the above problems encountered with the conventional wheel suspension apparatus.

Another object of the present invention is to provide a front wheel suspension apparatus including right and left strut bars which have a torsion bar mounted to the right and left strut bars through an elastic tiebar member, respectively, for reducing a rolling of the vehicle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a front wheel suspension apparatus for a vehicle, including an elastic tiebar member connected to a torsion bar and a strut bar, the elastic tiebar having an elastic material tube for absorbing any impact delivered from the strut bar, an outer or inner tube connected to a frame through the link for preventing the impact from being delivered to the frame.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a perspective view of a front wheel suspension apparatus for a vehicle according to the present invention containing cut-away portions in order to illustrate the construction thereof;

FIG. 4 is a front elevational view of additional embodiments of the elastic tiebar member of the front wheel suspension apparatus according to the present invention containing cut-away portions in order to illustrate the construction thereof.

DETAILED DESCRIPTION OF THE PREFERRED EMBODIMENTS

Figure 1:
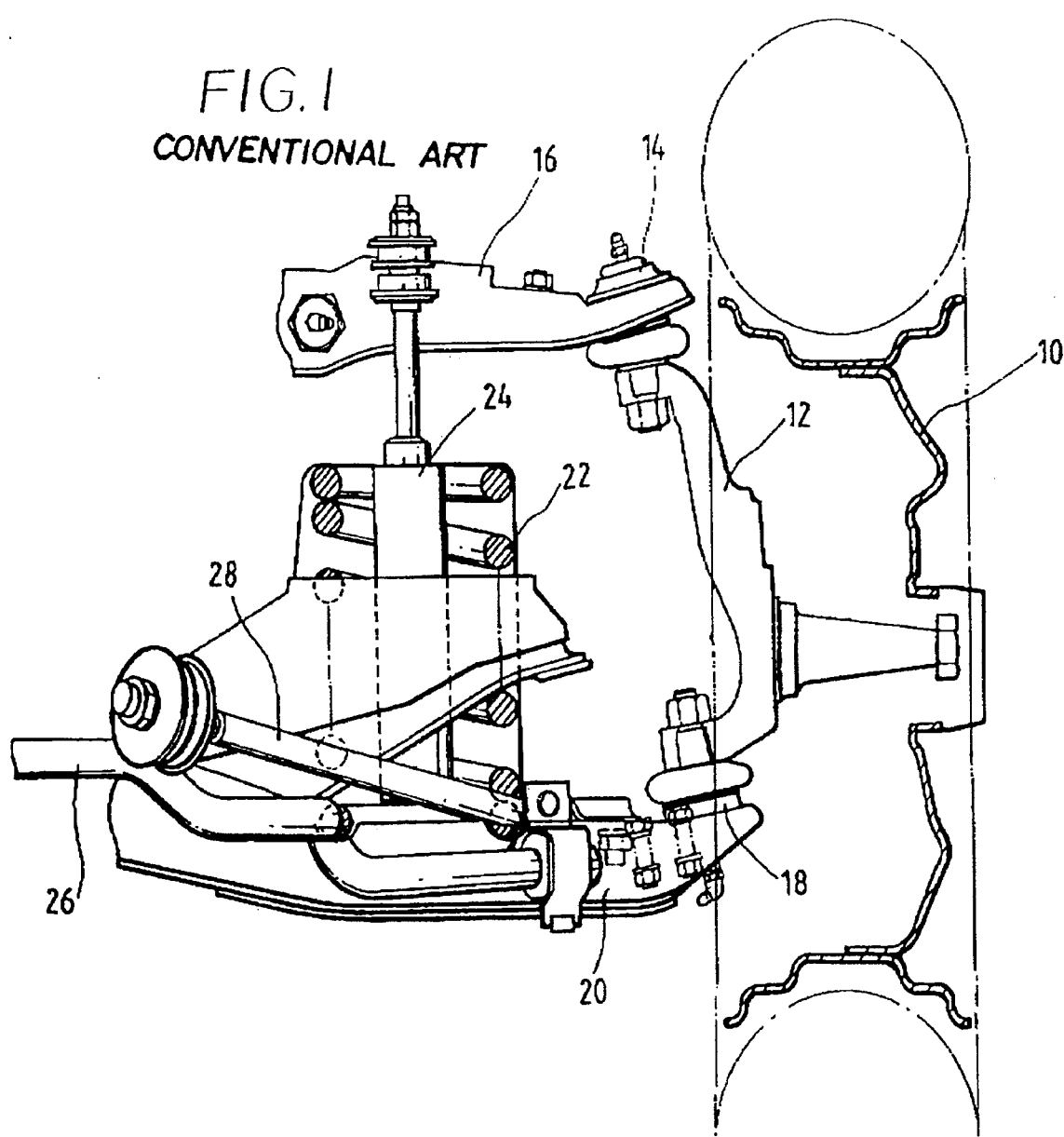
FIG. 1 is a perspective view of a conventional front wheel suspension apparatus for a vehicle containing cutaway portions in order to illustrate the construction thereof.
Figure 3:
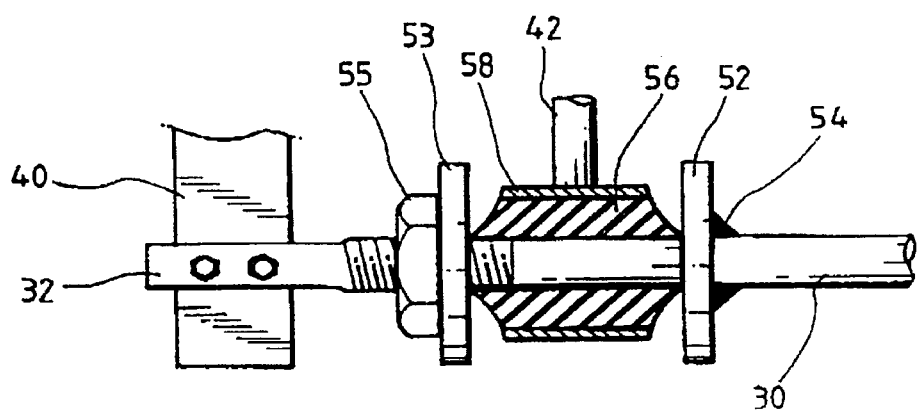
FIG. 3 is a front elevational view of an elastic tiebar member of the front wheel suspension apparatus for a vehicle according to the present invention containing cut-away portions in order to illustrate the construction thereof.

Referring now in detail to the drawings for the purpose of illustrating preferred embodiments of the present invention, the front wheel suspension apparatus for a vehicle as shown in FIGS. 2 and 3, comprises an upper arm 16 disposed at an upper portion of a wheel supporter 12 by an upper ball joint 14 for enabling movement of the upper arm 16 in the right and left, and up and down directions, a lower arm 20 disposed at a lower portion of the wheel supporter 12 by a lower ball joint 18 for enabling movement of the lower arm 20 in the right and left, and up and down directions, a coil spring 22 disposed between the upper and lower arms 16 and 20, a shock absorber 24 longitudinally disposed within the coil spring 22, and at least one strut bar 30 connected at one end thereof to the lower arm 20 and at an opposing end thereof to a first elastic tiebar member 50. The strut bar 30 is one to three, preferably two, more preferably one.

A torsion bar 40 is movably connected to the strut bar 30 through the elastic tiebar member 50 for absorbing the rolling of the vehicle. That is, the elastic tiebar member 50 is connected to other end of the strut bar 30 at a first bracket 52 thereof, and to the torsion bar 40 through an extension 32 extending therefrom.

The elastic tiebar member 50 includes a pair of first and second brackets 52 and 53 disposed on both end surfaces thereof for restricting a horizontal movement and a link 42 extending transversely therefrom for connection to a frame 44. At this time, the first elastic tiebar member 50 is movably connected to the frame 44 through the link 42. Both the first and second brackets 52 and 53 are connected to the strut bar 30 and the extension 32 through a melting or welded portion 54 and a nut 55, respectively.

As shown in FIG. 3, the first elastic tiebar member 50 further includes an elastic material tube 56 for slidably receiving the strut bar 30 so as to absorb any vibration or impact generated by the strut bar 30, and an outer tube 58 for slidably receiving the elastic material tube 56. The outer tube 58 is attached to the link 42. The elastic material tube is made of rubber or the like.

In assembling, after the strut bar 30 is inserted into the elastic material tube 56, the brackets 52 and 53 are mounted to both end surfaces of the first elastic tiebar member 50 by welding at portion 54 and by the nut 55, respectively. Thereafter, the torsion bar 40 is attached to the extension 32 of the first elastic tiebar member 50. The elastic tiebar member 50 functions to absorb any impact and rolling of horizontal and vertical movement of the strut bar 30.

Referring in detail to FIG. 4, there is an illustration of an additional embodiment of a front wheel suspension apparatus according to the present invention. A second elastic tiebar member 70 includes an inner tube 76 for slidably receiving the strut bar 30, a pair of a first and a second strut bracket 64 firmly fixed to the inner tube 76 and the frame 44, a pair of third and fourth brackets 72 and 73 attached to both end surfaces of the elastic tiebar member 70, a stopper 78 attached to the first and second strut bracket 64, and a pair of elastic material tubes 80 disposed between the pair of brackets 72 and 73 and the stopper 78 so as to absorb any impact delivered from the strut bar 30. Both brackets 72 and 73 are fixed to the strut bar 30 through a melting portion 76 and a nut 75. The elastic material tubes are formed of rubber or the like.

Accordingly, the front wheel suspension apparatus according to the present invention provides the first and second elastic tiebar members 50 and 70 for absorbing any impact, the outer and inner tubes 56 and 76 for preventing delivery of any impact, and brackets 52, 53, 72 and 73 for restricting movement of the elastic material tubes 56 and 76 so that the front wheel suspension apparatus for a vehicle can effectively reduce a rolling of the vehicle.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A front wheel suspension apparatus for a vehicle, comprising:
    a wheel supporter for rotatably supporting a wheel;
    an upper arm movably connected to said wheel supporter through an upper joint, and a lower arm movably connected to said wheel supporter through a lower joint;
    a spring member disposed between said upper arm and said lower arm for reducing a rolling of the vehicle;
    a shock absorber disposed within said spring member for absorbing a rolling of said spring member;
    at least one strut bar fixed to said lower arm at one end thereof;
    an elastic tiebar member connected to another end of said strut bar at one end thereof, wherein said elastic tiebar member includes:
        a pair of first and second brackets,
        an elastic material tube surrounding said strut bar for absorbing any impact, said elastic material tube having an outer length shorter than an inner length adjacent said strut bar,
        an outer tube surrounding only said elastic material tube and connected to a radially extending link connected to a vehicle frame,
        means for securing said first and second brackets to said strut bar, and
        an extension member longitudinally extending from said strut bar; and
    a torsion bar connected to another end of said elastic tiebar member by said extension member, whereby the front wheel suspension apparatus can effectively reduce the rolling of the vehicle, which is delivered from a surface of a rough road and a vibration of wheels.

2. The front wheel suspension apparatus of claim 1, wherein said spring member is a coil spring.

3. The front wheel suspension apparatus of claim 1, wherein said at least one strut bar consists of one strut bar member.

4. The front wheel suspension apparatus of claim 1, wherein said elastic material tube is made of rubber.

5. The front wheel suspension apparatus of claim 1, wherein said means for securing is a welded portion at said strut bar and said first bracket, and is a nut at said strut bar and said second bracket.

6. A front wheel suspension apparatus for a vehicle, comprising:
    a wheel supporter for rotatably supporting a wheel;
    an upper arm movably connected to said wheel supporter through an upper joint, and a lower arm movably connected to said wheel supporter through a lower joint;
    a spring member disposed between said upper arm and said lower arm for reducing a rolling of the vehicle;
    a shock absorber disposed within said spring member for absorbing a rolling of said spring member;
    at least one strut bar fixed to said lower arm at one end thereof;
    an elastic tiebar member connected to another end of said strut bar at one end thereof, wherein said elastic tiebar member includes:
        an inner tube surrounding a predetermined length of said strut bar,
        a pair of a first and a second strut bracket radially extending from said inner tube,
        an elastic stopper member molded around said inner tube and said first and second radially extending strut brackets,
        a pair of elastic material tubes surrounding said strut bar and said stopper and said inner tube such that said pair of elastic material tubes abut against opposing longitudinal ends of said inner tube and opposing sides of said stopper,
        a pair of bracket members secured to said strut bar at outer sides of said pair of elastic material tubes, means for securing said bracket members to said strut bar, and an extension member aligned with a longitudinal axis of and extending from an end of said strut bar; and a torsion bar connected to another end of said elastic tiebar member by said extension member, whereby the front wheel suspension apparatus can effectively reduce the rolling of the vehicle, which is delivered from a surface of a rough road and a vibration of wheels.

7. The front wheel suspension apparatus of claim 6, wherein said spring member is a coil spring.

8. The front wheel suspension apparatus of claim 7, wherein said elastic material tube are made of rubber.

9. The front wheel suspension apparatus of claim 7, wherein said means for securing is a welded portion at said strut bar and a first one of said bracket members, and is a nut at said strut bar and a second one of said bracket members.

* * * * *